United States Patent
Ringseth et al.

(10) Patent No.: US 9,384,063 B2
(45) Date of Patent: Jul. 5, 2016

(54) ELIDING SYNCHRONIZATION IN A CONCURRENT DATA STRUCTURE

(75) Inventors: Paul Ringseth, Bellevue, WA (US); Michael L. Chu, Bellevue, WA (US); William R. Messmer, Woodinville, WA (US); Marko Radmilac, Bellevue, WA (US); Genevieve Fernandes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 12/486,945

(22) Filed: Jun. 18, 2009

(65) Prior Publication Data

US 2010/0325098 A1 Dec. 23, 2010

(51) Int. Cl.
*G06F 17/30* (2006.01)
*G06F 9/52* (2006.01)

(52) U.S. Cl.
CPC ............ *G06F 9/52* (2013.01); *G06F 17/30356* (2013.01)

(58) Field of Classification Search
CPC ................................................ G06F 17/30356
See application file for complete search history.

(56) References Cited

U.S. PATENT DOCUMENTS

| 5,678,032 | A * | 10/1997 | Woods et al. ................... 703/26 |
| 7,308,539 | B2 | 12/2007 | Fuhs et al. |
| 7,734,881 | B2 * | 6/2010 | McKenney et al. ............ 711/159 |
| 7,788,242 | B2 * | 8/2010 | Shavit et al. ................... 707/704 |
| 2007/0050563 | A1 | 3/2007 | Alsup |
| 2008/0042923 | A1 * | 2/2008 | De Laet ......................... 345/1.3 |
| 2008/0112423 | A1 | 5/2008 | Christenson |
| 2008/0115117 | A1 * | 5/2008 | Wilkinson et al. ............ 717/139 |
| 2008/0208558 | A1 | 8/2008 | Wang et al. |
| 2009/0292705 | A1 * | 11/2009 | McKenney ....... G06F 17/30356 |

OTHER PUBLICATIONS

"Non-blocking synchronization", Retrieved at <<http://en.wikipedia.org/wiki/Lock-free_and_wait-free_algorithms>>, Apr. 3, 2009, pp. 5.
Prakash, et al., "Non-blocking algorithms for concurrent data structures", Retrieved at <<https://eprints.kfupm.edu.sa/53265/1/53265.pdf>>, Jul. 1, 1991, pp. 40.
Massalin, et al., "A Lock-free Multiprocessor OS kernel", Retrieved at <<http://citeseerx.ist.psu.edu/viewdoc/download?doi=10.1.1.39.8065&retype=pdf>>, Technical Report No. CUCS-005-91, Jun. 19, 1991, pp. 21.
Stauffer, et al., "PRAM Algorithms for Static Dictionary Compression", Retrieved at <<http://ieeexplore.ieee.org/stamp/stamp.jsp?tp=&arnumber=288279&isnumber=7174>>, Proceedings of the 8th International Symposium on Parallel Processing, Apr. 26-29, 1994, pp. 344-348.

(Continued)

*Primary Examiner* — Dinku Gebresenbet
(74) *Attorney, Agent, or Firm* — Kevin Sullivan; Kate Drakos; Micky Minhas

(57) ABSTRACT

A concurrent data structure allows synchronization to be elided for read accesses. Processing resources that remove one or more elements of the concurrent data structure are allowed to delete the elements only after all other processing resources have reached a safe point. Each processing resource maintains an indicator that indicates whether the processing resource has reached as safe point (i.e., will not access the concurrent data structure). When the indicators indicate that all processing resources have reached a safe point, elements of the data structure may be deleted.

19 Claims, 3 Drawing Sheets

(56) References Cited

OTHER PUBLICATIONS

Michael, Maged M., "Hazard Pointers: Safe Memory Reclamation for Lock-Free Objects", Retrieved at <<http://www.researchibm.com/people/m/michael/ieeetpds-2004.pdf>>, IEEE Transactions on Parallel and Distributed Systems, vol. 15, No. 6, Jun. 2004, pp. 491-504.

"Parallel Random Access Memory", Retrieved at <<http://en.wikipedia.org/wiki/EREW>>, Apr. 8, 2009, pp. 2.

* cited by examiner

ELIDING SYNCHRONIZATION IN A CONCURRENT DATA STRUCTURE

BACKGROUND

Processes executed in a computer system may be configured to execute different parts of the process concurrently. Where these different parts of the process may access the same data concurrently, the accesses to the data are typically synchronized. For example, when an execution context (e.g., a thread, fiber, or child process) of a process accesses data, it generally invokes a lock or other synchronization technique to ensure that no other execution context of the process performs a conflicting access to the data. The synchronization prevents data from being corrupted but adds processing overhead to each data access and may serialize the access to the data by different execution contexts. This serialization may inhibit the performance and scalability of a process, particularly where there are many independent processing resources that execute execution contexts.

A process may wish to perform concurrent operations on a collective set of data. In doing so, different execution contexts of the process may add data to or remove data from the collective set of data in an arbitrary order. The process may wish to remove elements of the set of data at some point in the execution. While various synchronization mechanisms may be used to allow elements of the set of data to be removed, the synchronization mechanisms may inhibit the performance and scalability of the process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A concurrent data structure allows synchronization to be elided for read accesses. Processing resources that remove one or more elements of the concurrent data structure are allowed to delete the elements only after all other processing resources have reached a safe point. Each processing resource maintains an indicator that indicates whether the processing resource has reached as safe point (i.e., will not access the concurrent data structure). When the indicators indicate that all processing resources have reached a safe point, elements of the data structure may be deleted.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
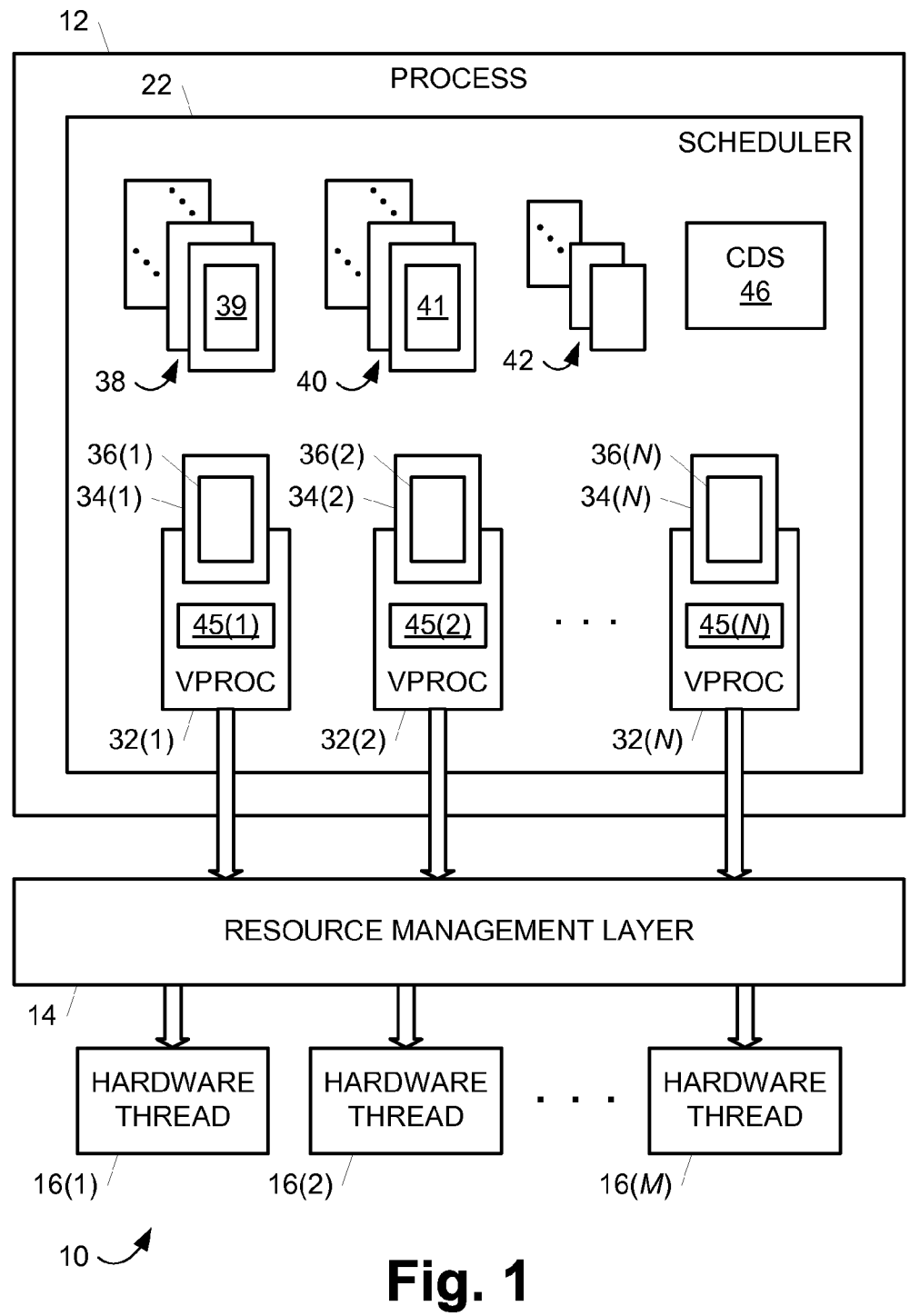
FIG. 1 is a block diagram illustrating an embodiment of a scheduler configured to schedule execution contexts for execution by processing resources.

FIG. 1 is a block diagram illustrating an embodiment of concurrent data structure 46 in a scheduler 22 in a process 12 of a runtime environment 10. Scheduler 22 is configured to schedule execution contexts for execution by processing resources where the execution contexts may concurrently access concurrent data structure 46.

Runtime environment 10 represents a runtime mode of operation in a computer system, such as a computer system 100 shown in FIG. 5 and described in additional detail below, where the computer system is executing instructions. The computer system generates runtime environment 10 from a runtime platform such as a runtime platform 122 shown in FIG. 5 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using an operating system (OS) such as an OS 120 shown in FIG. 5 and described in additional detail below, resource management layer 14, and hardware threads 16(1)-16(M). Runtime environment 10 operates in conjunction with the OS and/or resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads, fibers, or child processes). Process 12 obtains access to the processing and other resources in the computer system (e.g., hardware threads 16(1)-16(M)) from the OS and/or resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread, fiber, or child process that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from the OS in the embodiment of FIG. 1. In other embodiments, resource management layer 14 or some or all of the functions thereof may be included in the OS.

Hardware threads 16 reside in execution cores of a set or one or more processor packages (e.g., processor packages 102 shown in FIG. 5 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more runnable execution contexts 38 and a set of zero or more blocked (i.e., wait-dependent) execution contexts 40. Each execution context 34, 38, and 40 includes state information that indicates whether an execution context 34, 38, or 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked also include an associated task 41 and are waiting for data, a message, or an event that is being generated by another execution context 34 or will be generated by another execution context 38 or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 40 by generating data, a message, or an event that will be used by other execution contexts 40.

Each task in scheduler 22 may be realized (e.g., realized tasks 36 and 39), which indicates that an execution context 34 or 38 has been or will be attached to the task and the task is ready to execute. Realized tasks typically include lightweight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel or parallel for). Scheduler 22 may be organized into a synchronized collection (e.g., a stack and/or a queue) for logically independent tasks with execution contexts (i.e., realized tasks) along with a list of worksteal ing queues for dependent tasks (i.e., unrealized tasks).

Prior to executing tasks, scheduler 22 obtains execution contexts 34, 38, and 40 from runtime environment 10, resource management layer 14, or the operating system. Available virtual processors 32 locate and execute execution contexts 34 to begin executing tasks. Virtual processors 32 become available again in response to an execution context 34 completing, blocking, or otherwise being interrupted (e.g., explicit yielding or forced preemption). When virtual processors 32 become available, the available virtual processor 32 may switch to a runnable execution context 38 to execute an associated task 39. The available virtual processor 32 may also execute a next task 39 or 42 as a continuation on a current execution context 34 if the previous task 36 executed by the current execution context 34 completed.

Scheduler 22 searches for a runnable execution context 38, a realized task 39, or an unrealized task 42 to attach to the available virtual processor 32 for execution in any suitable way. For example, scheduler 22 may search for a runnable execution context 38 to execute before searching for a realized task 39 or an unrealized task 42 to execute. Scheduler 22 continues attaching execution contexts 38 to available virtual processors 32 for execution until all tasks and execution contexts 38 of scheduler 22 have been executed. In other embodiments, runnable execution contexts 38 and realized tasks 39 may be merged into single concept from the perspective of schedulers 22.

Figure 2:
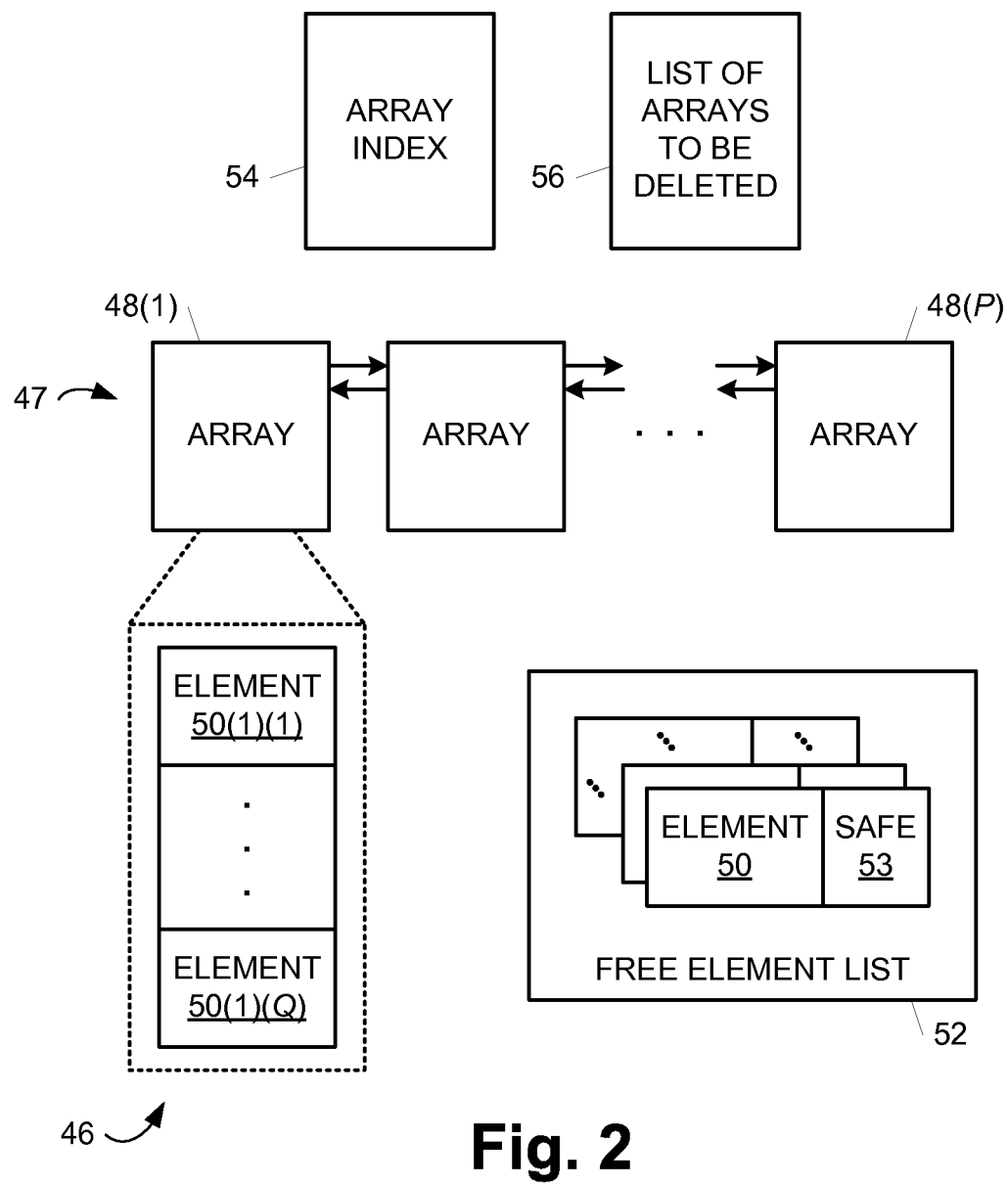
FIG. 2 is a block diagram illustrating an embodiment of a concurrent data structure.

Runtime environment 10 is configured to use a concurrent data structure 46 that allows synchronization to be elided for read accesses. FIG. 2 is a block diagram illustrating an embodiment of concurrent data structure 46. Concurrent data structure 46 includes a doubly linked list of arrays 48(1)-48(P) (referred to as a list array 47) where P is an integer that is greater than or equal to one and denotes the Pth array 48(P). Each array 48 includes a corresponding set of elements 50 (e.g., elements 50(1)(1)-50(1)(Q) in array 48(1) where Q is an integer that is greater than or equal to one and denotes the Qth element 50(Q)). In one embodiment, each array 48 in the set of arrays has a number of elements 50 that is equal to a number of bits of a machine word of the computer system (e.g., Q is equal to 32 or 64 for each array 48) to allow fast bit arithmetic to be used for array accesses. In other embodiments, each array 48 includes other suitable numbers of elements 50.

Runtime environment 10 includes a concurrent data structure function that generates concurrent data structure 46 using any suitable programming constructs. In one embodiment, the concurrent data structure function is invoked within runtime environment 10 to create concurrent data structures 46 that manage the operation of schedulers 22. In other embodiments, the concurrent data structure function may be exposed as an application programming interface (API) to allow process 12 and/or scheduler 22 to create and use concurrent data structures 46.

Concurrent data structure 46 allows each processing resource (e.g., virtual processors 32) to concurrently access elements 50. The processing resources may read any element 50 without synchronization but are allowed to delete one or more elements 50 of the concurrent data structure 46 only after all other processing resources have reached a safe point. As shown in FIG. 1, each virtual processor 32 maintains an indicator 45 that indicates whether a corresponding virtual processor 32 has reached as safe point with respect to the data structure 46 or a previous version thereof. A safe point is a point of execution of the virtual processor 32 where the virtual processor 32 will not access concurrent data structure 46 or a previous version thereof. When all indicators 45(1)-45(N) indicate that all virtual processors 32 have reached a safe point, an execution context 34 executing on virtual processor 32 may delete one or more elements 50 of concurrent data structure 46.

Runtime environment 10 may create list array 47 with any suitable predefined or programmatically selected number and/or sizes of arrays 48. Once created, an execution context 34 inserts elements 50 into list array 47. A free element list 52 stores a set of zero or more elements 50 that were previously used in list array 47 along with corresponding safe indicator 53 for each element 50 in the set. Each safe indicator 53 indicates whether a corresponding element 50 in free element list 52 is safe to delete and/or reuse. If free element list 52 includes an element 50 that is safe to reuse, then execution context 34 performs an atomic compare and swap (CAS) operation on the element 50 to remove the element 50 from free element list 52 and performs a CAS operation to insert to the element 50 into list array 47. If free element list 52 does not include an element 50 that is safe to reuse (i.e., free element list 52 is empty or none of the elements 50 in free element list 52 are safe to reuse), then execution context 34 performs a CAS operation to insert an element 50 into the array 48 at the end of list array 47 if that array 48 is not full. If all arrays 48 are full, runtime environment 10 adds a new array 48 to list array 47 and performs a CAS operation to insert an element 50 into the new array 48 in list array 47.

After elements 50 are inserted in list array 47, execution contexts 34 performs read accesses to the elements 50 without synchronization and performs write operations to the elements 50 using CAS or other suitable operations. An execution context 34 accesses an array index 54 using an index to locate the array 48 that includes the element 50 and uses a sub-index to locate element 50 in the array 48. For embodiments that use 64 elements 50 in each array 48, the index of the array 48 that includes the element 50 may be identified by right shifting the address by six places and the sub-index may identified as the first six bits in the address.

To delete an element 50 from list array 47, an execution context 34 performs a CAS operation to move the element 50 from list array 47 to free element list 52 and sets the corresponding safe indicator 53 to indicate that the element 50 is not safe to be deleted. Before changing the safe indicator 53 to indicate that the element 50 is safe to delete, the execution context 34 ensures that all virtual processors 32 have reached a safe point with respect to data structure 46 using indicators 45. In some embodiments, elements 50 in free element list 52 may be reused in list array 47 prior to becoming safe to delete.

In one embodiment, an execution context 34 sets all indicators 45 of all virtual processors 32 to a first value (e.g., clears a bit indicator on each virtual processor 32) when an element 50 is moved from list array 47 to free element list 52. Each virtual processor 32 sets its corresponding indicator 45 to a second value that differs from the first value (e.g., sets the bit indicator on each virtual processor 32) when that virtual processor 32 can ensure that it will not execute an execution context 34 that accesses concurrent data structure 46. When all indicators 45 have been set to the second value, the execution context 34 determines that a safe point has been reached and changes the safe indicator 53 to indicate that the element 50 is safe to delete. The execution context 34 may delete the element 50 or allow the element 50 to remain in free element list 52 for reuse.

Figure 3:
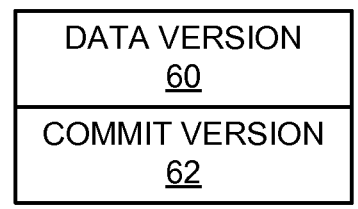
FIG. 3 is a block diagram illustrating an embodiment of indicators used to determine a safe point.

In another embodiment, scheduler 22 or each concurrent data structure 46 includes a data version 60 and a commit version 62 that are accessible by each virtual processor 32 as shown in FIG. 3. Execution contexts 34 use data version 60 and commit version 62 along with indicators 45 to determine whether a safe point has been reached. In addition, the execution context 34 sets the corresponding safe indicator 53 to indicate that the element 50 is not safe to be deleted by storing an incremented data version 60 as the safe indicator 53 when an element 50 is moved from list array 47 to free element list 52.

Data version 60 and commit version 62 are initialized to be equal to one another and equal each indicator 45. Periodically (e.g., when free element list 52 becomes full) or each time that an execution context 34 moves an element 50 from list array 47 to free element list 52, execution context 34 increments data version 60.

Any time that an execution context 34 executing on a virtual processor 32 reaches a safe point, the execution context 34 sets the indicator 45 of the virtual processor 32 to be equal to the data version 60 and attempts to commit the current or an intermediate data version. If the indicators 45 in each virtual processor 32 are greater than the current commit version 62, then the execution context 34 commits the current or an intermediate data version by storing the lowest value of the set of all indicators 45 as commit version 62.

In addition to committing a data version to commit version 62, the execution context 34 sets any safe indicators 53 with values less than or equal to the committed data version to indicate that the corresponding elements 50 are safe to delete. The execution context 34 may delete the element or elements 50 that are safe to delete or allow the element or elements 50 to remain in free element list 52 for reuse.

In one embodiment, each virtual processor 32 sets its corresponding indicator 45 to indicate that a safe point has been reached in a dispatch loop that dispatches execution contexts 34 of scheduler 22 to execute tasks of process 12 for execution. In this embodiment, the dispatch loop distinguishes between executing tasks that implement scheduling functions of scheduler 22 and tasks of process 12. After executing tasks that implement scheduling functions, the dispatch loop knows that concurrent data structures 46 used by the scheduling functions will not be accessed by the virtual processor 32 while the virtual processor 32 is executing tasks of process 12. Accordingly, the dispatch loop sets the indicator 45 upon initiating the execution of tasks of process 12 in this embodiment. In other embodiments, each virtual processor 32 may sets its corresponding indicator 45 using other suitable criteria that indicate that a previous version of concurrent data structure 46 will not be accessed by the virtual processor 32.

To remove an array 48 from list array 47, the runtime environment 10 moves the array to a list 56 of arrays 48 to be deleted with synchronization. Before removing array 48 from list 56, the execution context 34 ensures that all virtual processors 32 have reached a safe point using indicators 45 as described above. After determining that no virtual processors 32 will access concurrent data structure 46, the execution context 34 removes array 48 from list 56.

Figure 4:
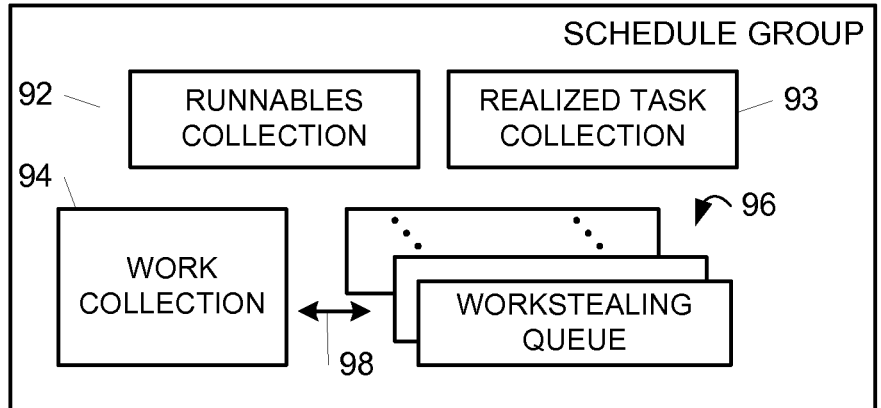
FIG. 4 is a block diagram illustrating an embodiment of a schedule group for use in a scheduler.

In one embodiment, process 12 (shown in FIG. 1) organizes tasks into one or more schedule groups 90 (shown in FIG. 5) and presents schedule groups 90 to scheduler 22 as shown in FIG. 4. In other embodiments, process 12 organizes tasks into collections for each virtual processor 32 of scheduler 22 in other suitable ways.

FIG. 4 is a block diagram illustrating an embodiment of a schedule group 90 for use in a scheduler 22. Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 39 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42 with no assigned execution context 34 or 38.

Using the embodiment of FIG. 4, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 39 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 39 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

In one embodiment, runtime environment 10 creates concurrent data structures 46 to manage schedule groups 90. Runtime environment 10 also creates concurrent data structures 46 to manage local collections of tasks for each virtual processor 32. Additional details of local collections of tasks for each virtual processor 32 may be found in co-pending U.S. patent application Ser. No. 12/121,789, filed on May 16, 2008, and entitled LOCAL COLLECTIONS OF TASKS IN A SCHEDULER which is incorporated by reference herein. In addition, runtime environment 10 creates concurrent data structures 46 to manage scheduling collections of tasks for scheduling nodes (not shown). Additional details of scheduling collections of tasks for scheduling nodes may be found in co-pending U.S. patent application Ser. No. 12/121,794, filed on May 16, 2008, and entitled SCHEDULING COLLECTIONS IN A SCHEDULER which is incorporated by reference herein.

In other embodiments, schedule groups 90 contain other suitable numbers, types, and/or configurations of task collections.

Figure 5:
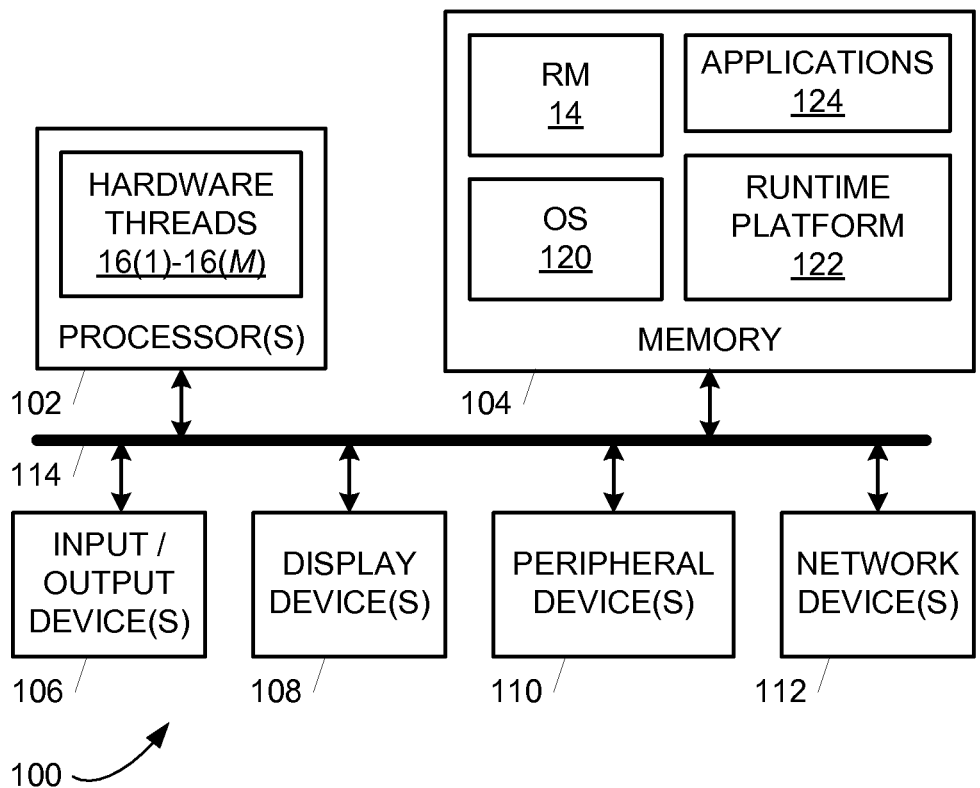
FIG. 5 is a block diagram illustrating an embodiment of a computer system configured to implement a runtime environment with concurrent data structures 46.

FIG. 5 is a block diagram illustrating an embodiment of computer system 100 which is configured to implement runtime environment 10 with concurrent data structures 46 as described above.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), OS 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and/or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. Memory system 104 may include any suitable cache hierarchy, be configured as a shared or distributed memory system, and may embody a locality scheme such as a non-uniform memory access (NUMA) scheme. In addition, memory system 104 may be configured as a single instruction stream multiple different memory store (SIMD) system, a multiple instruction stream multiple different memory store (MIMD) system, or a computer cluster coupled through a messaging protocol such as concurrent read, concurrent write (CRCW), concurrent read, exclusive write (CREW), or parallel random access machine (PRAM).

The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium storing computer-executable instructions that, when executed by a computer system, perform a method comprising:

identifying an element present in a concurrent data structure for deletion;

receiving an indicator from each of a set of processing resources that declares whether or not a corresponding processing resource will access the concurrent data structure that is accessible by the corresponding processing resource;

determining whether or not a safe point has been reached in which the set of processing resources will not access the concurrent data structure based on the indicator from each of the set of processing resources; and allowing the element in the concurrent data structure to be deleted if the safe point has been reached.

2. The computer readable storage medium of claim 1, the method further comprising:

allowing a set of execution contexts executing on the set of processing resources to read the element without synchronization prior to deleting the element from the concurrent data structure.

3. The computer readable storage medium of claim 1, the method further comprising:

determining that each of the set of processing resources have reached the safe point using the indicator for each of the set of processing resources, a data version of the concurrent data structure, and a commit version of the concurrent data structure.

4. The computer readable storage medium of claim 1, the method further comprising:

determining that each of the set of processing resources have reached the safe point using the indicator for each of the set of processing resources including a respective virtual processor and a respective hardware thread.

5. The computer readable storage medium of claim 4, the method further comprising:

allocating the set of processing resources to a scheduler in a process executing on the computer system.

6. The computer readable storage medium of claim 1, the method further comprising:

configuring the concurrent data structure as a linked list of a set of arrays that include the element.

7. The computer-readable storage medium of claim 1, the method further comprises receiving an indicator maintained by each of the set of processing resources.

8. The computer readable storage medium of claim 1, the method further comprises allowing the element in the concurrent data structure to be deleted without invoking a lock.

9. A method performed in a process executing on a computer system, the method comprising:

moving one of a set of elements of a concurrent data structure that is accessible by a set of processing resources of the computer system to a free element list;

receiving a safe indicator from the free element list that declares whether or not a safe point has been reached to delete the one of the set of elements, wherein the safe point is a time that none of the set of processing resources will access the one of the set of elements; and deleting the one of the set of elements from the concurrent data structure after ensuring that each of the set of processing resources will not access a version of the concurrent data structure corresponding to the one of the set of elements—based on the safe indicator.

10. The method of claim 9 further comprising:

allowing a set of execution contexts executing on the set of processing resources to access the one of the set of elements subsequent to moving the one of the set of elements to the free element list and prior to deleting the one of the set of elements.

11. The method of claim 9 further comprising:

creating the concurrent data structure as a linked list of a set of arrays that include the element.

12. The method of claim 11 further comprising:

setting the safe indicator corresponding to the one of the set of elements after ensuring that each of the set of processing resources will not access a version of the concurrent data structure corresponding to the one of the set of elements.

13. The method of claim 11 further comprising:

moving one of the set of arrays to a list of arrays to be deleted; and removing the one of the set of arrays from the linked list after ensuring that each of the set of processing resources will not access the concurrent data structure.

14. The method of claim 11 further comprising:

creating the concurrent data structure as the linked list of the set of arrays in which one of the set of arrays has a number of elements equal to a number of bits of a machine word of the computer system.

15. A computer readable storage medium storing computer-executable instructions that, when executed by a computer system, perform a method comprising:

moving an element from a linked list of a set of arrays in a concurrent data structure to a free element list;

receiving a safe indicator from the free element list that declares whether or not a safe point has been reached to delete the element, wherein the safe point is a time that none of a set of processing resources will access the element accessible by the set of processing resources; and deleting the element from the free element list if the safe indicator indicates that the safe point has been reached to delete the element.

16. The computer readable storage medium of claim 15, the method further comprising:

allowing a set of execution contexts executing on the set of processing resources to access the element from the free element list subsequent to moving the element to the free element list and prior to deleting the element.

17. The computer readable storage medium of claim 16, the method further comprising:

allowing the set of execution contexts executing on the set of processing resources, including a respective virtual processor and a respective hardware thread, to access the element.

18. The computer readable storage medium of claim 17, the method further comprising:

allocating the virtual processors to a scheduler in a process executing on the computer system; and executing the set of execution contexts with the virtual processors.

19. The computer readable storage medium of claim 18, the method further comprising:

executing a dispatch loop on each of the virtual processors; and setting the indicators with the dispatch loop.

* * * * *